United States Patent [19]
Cornelius

[11] 3,750,696
[45] Aug. 7, 1973

[54] MAYDAY SAFETY SHUTOFF SYSTEM RESPONSIVE TO ERRANT TOWERS OF AN AUTOMATIC IRRIGATION SYSTEM

[75] Inventor: Gail Cornelius, Portland, Oreg.

[73] Assignee: R. M. Wade & Co., Portland, Oreg.

[22] Filed: July 20, 1972

[21] Appl. No.: 273,524

Related U.S. Application Data
[63] Continuation of Ser. No. 30,824, April 22, 1970, abandoned.

[52] U.S. Cl. .................................. 137/344, 239/212
[51] Int. Cl. ........................... B05b 9/02, E01h 3/02
[58] Field of Search ..................... 137/344; 239/212, 239/213

[56] References Cited
UNITED STATES PATENTS

| | | | |
|---|---|---|---|
| 2,800,364 | 7/1957 | Dick et al. ..................... | 239/212 X |
| 3,281,080 | 10/1966 | Hogg ............................. | 137/344 X |
| 3,386,661 | 6/1968 | Olson et al. ..................... | 137/344 X |
| 3,394,729 | 7/1968 | Bower et al. .................... | 137/344 |
| 3,417,766 | 12/1968 | Purtell ........................... | 137/344 X |
| 3,446,434 | 5/1969 | Smith, Jr. et al. ............... | 137/344 X |
| 3,478,773 | 11/1969 | Husky ............................. | 137/344 |
| 3,500,856 | 3/1970 | Boone et al. .................... | 137/344 |

*Primary Examiner*—Samuel Scott
*Attorney*—Fryer, Tjensvold, Feix, Phillips & Lempio

[57] ABSTRACT

A safety control system for shutting down a self-propelled sprinkling apparatus when any of the towers, and thus the pipeline supported thereby, deviates from a substantially straight line relationship with the rest of the towers. Safety control means on each tower senses when the tower is leading or lagging the adjacent towers by more than a preselected distance, and in turn actuates means which terminates the flow of water to the pipeline and shuts down the entire sprinkling apparatus. Actuation is accomplished via the introduction of pressure, or by a drop in pre-established pressure.

13 Claims, 5 Drawing Figures

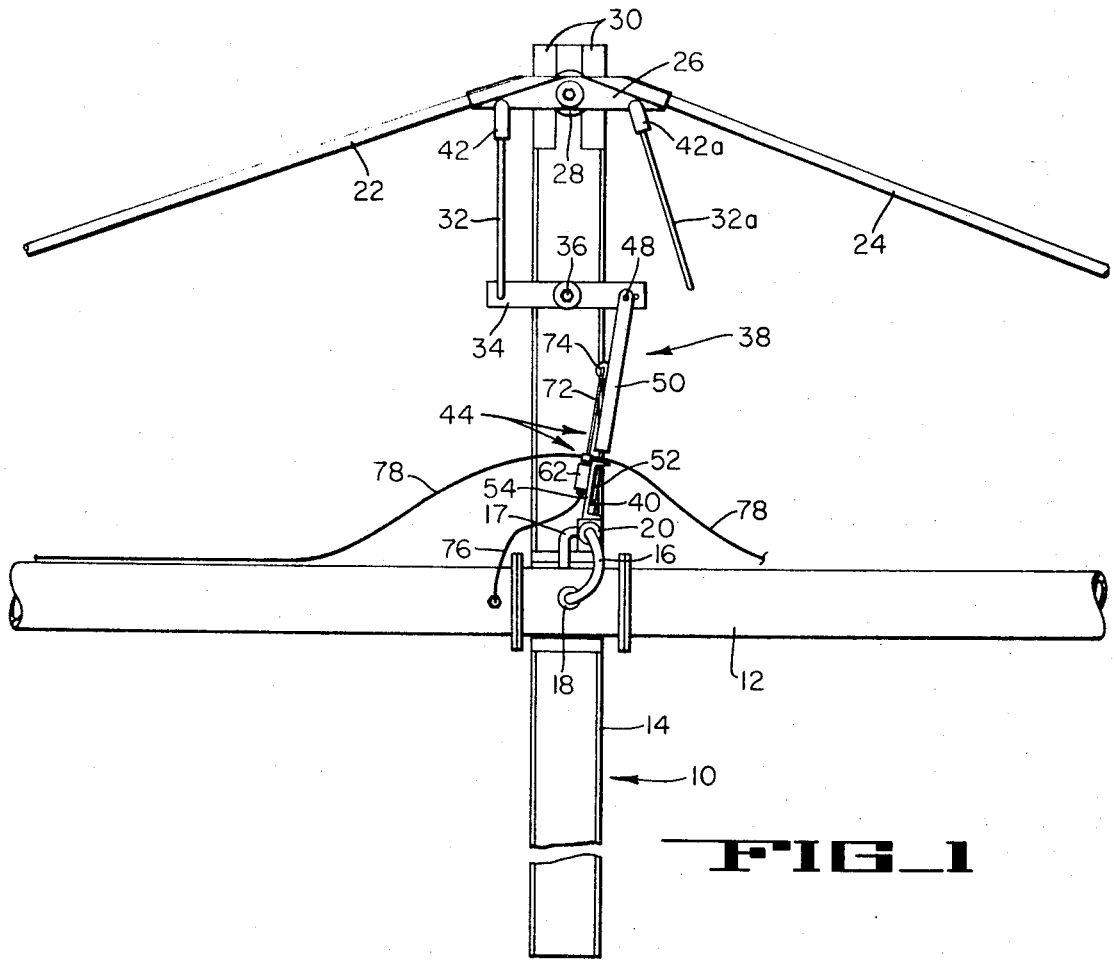
FIG_1
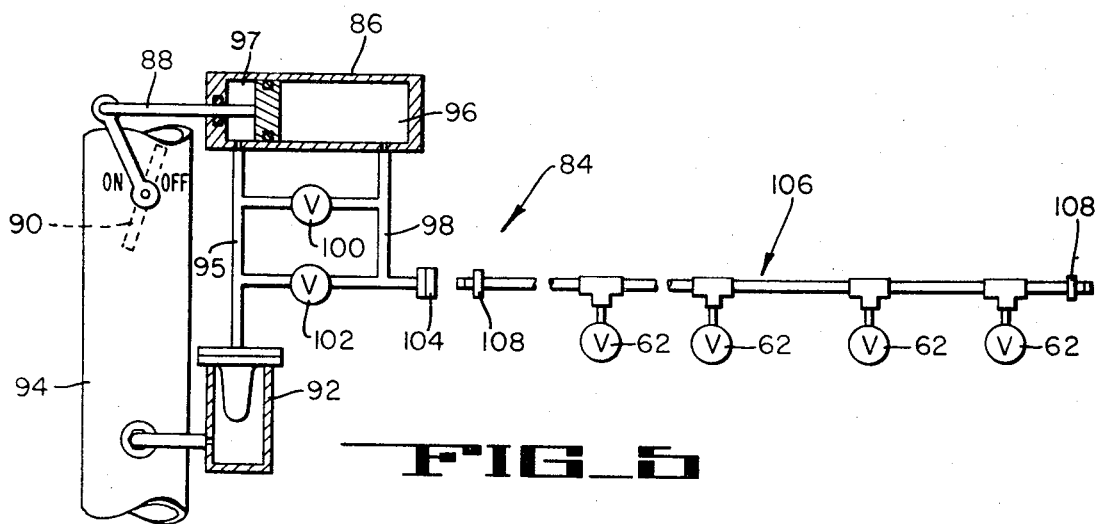
FIG_5
INVENTOR
GAIL CORNELIUS

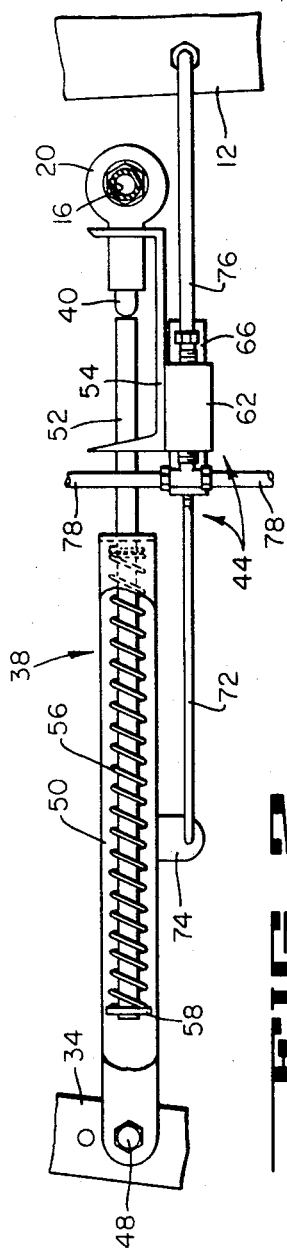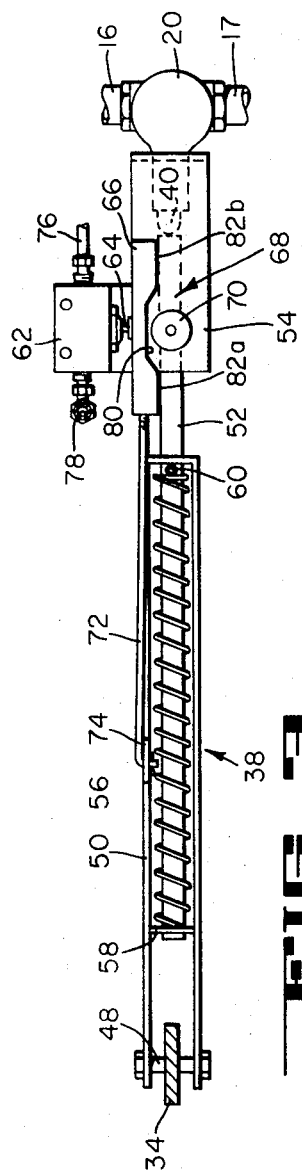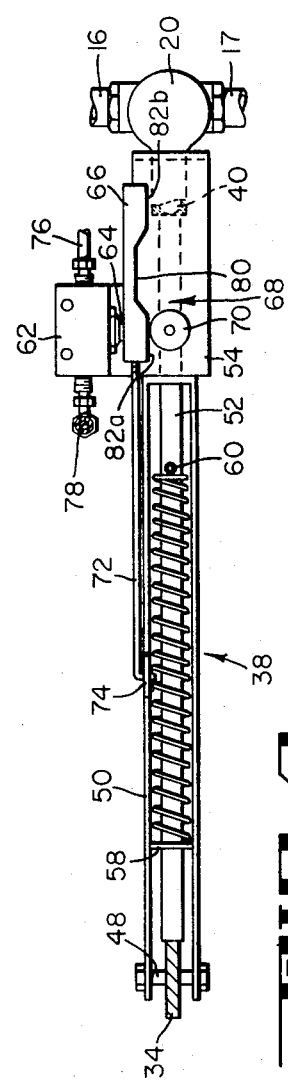

MAYDAY SAFETY SHUTOFF SYSTEM RESPONSIVE TO ERRANT TOWERS OF AN AUTOMATIC IRRIGATION SYSTEM

This application is a Continuation of application Ser. No. 30,824, Apr. 22, 1970 and now abandoned.

BACKGROUND OF THE INVENTION

1. Field

The invention relates to a safety control system for individual towers in an automatic sprinkling apparatus, which shuts down the entire apparatus when any of the towers deviates excessivly from its intended straight line relationship with the remaining towers. The actual apparatus and various additional control and other related features are disclosed in my Assignee's copending applications entitled "LATERALLY MOVING AUTOMATIC IRRIGATION SYSTEM", Ser. No. 805,664, filed Mar. 10, 1969, and "A 90° SAFETY SHUTOFF SYSTEM FOR SELF-PROPELLED SPRINKLING APPARATUS", Ser. No. 27,266, filed Apr. 10, 1970.

2. Prior Art

Various apparatus have been developed for moving a pipeline of, for example, a quarter of a mile in length, laterally across a large field. Typical of such apparatus are those which feed water to one end of the line via an extremely durable supply hose which is dragged on the ground by a driving means, such as a winch tractor, disposed at and supporting the end of the line. A sprinkler pipeline is carried above the ground on a spaced series of two-wheeled towers and is fed by the flexible hose of previous mention. Each tower has a water-powered motor whose output is coupled to the two wheels via reduction gearing, shafts, etc. Automatic control means associated with each tower regulates its speed relative to adjacent towers, whereby the line of pipe remains substantially straight as it progresses laterally across the field.

In such a laterally moving, sprinkling system, initial movement is imparted to the pipeline by the winch tractor. Successive bending of the pipeline occurs along the succession of support towers causing the advance of each succeeding tower via its respective automatic control means, until the last tower is actuated. As the last tower advances at a preselected greater speed than that of the tractor, it tends to straighten the curved pipe, stoppIng the towers in progression starting with the last tower and continuing towards those nearer the tractor. Thus, the long line of pipe progresses across the field. 38

Difficulties are encountered in trying to keep such a long pipeline substantially straight, and traveling at a right angle to the intended direction of travel of the winch tractor. Driving the wheels of the individual towers at exactly the same speed does not prove effective since variations in the terrain level and conditions causes corresponding variations in the lateral speed of the individual support towers.

The copending applications of previous mention disclose improved, laterally moving, automatic sprinkling systems capable of moving the long line of pipe forwardly on a substantially straight course with a minimum of attention, for extended periods of time, thus overcoming for the most part the above-mentioned difficulties. However, situations arise wherein although the overall pipeline is progressing across the field in a suitable, laterally-moving direction, individual support tower malfunctions can occur for any of various reasons, whereby one support tower may fail to start, or may continue running. For example, the valve controlling the flow of water to the motor of the tower may fail to open or close, a lever or hose of the automatic control system may fail, etc., thereby failing to provide the intended control action for the respective support tower. In such situations severe damage to the sprinkling apparatus can result.

These last mentioned problems are not limited to laterally moving sprinkling apparatus. Circular irrigation systems likewise may experience the same situation, wherein one tower of an aligned series of towers circling about a pivot point may not respond to the usual control action.

AccordIngly, various types of safety shutoff systems have been employed on such lateral and circular irrigation systems. Such shutoff systems generally are based on utilizing electrically and/or mechanically actuated systems which shut down the entire line when energized. Present shutoff systems are generally adapted to circular irrigation apparatus; in any event most shutoff systems are generally cumbersome, are not inherently fail-safe, require electrical power, and/or employ excessive mechanical linkage, cables, etc.

SUMMARY OF THE INVENTION

The present invention provides a "mayday" safety control system for the individual support towers of a long line of towers, which system is provided in part in integral combination with the conventional automatic control mechanism for controlling the movement of the individual towers. Valve means supported by each tower is adapted to respond to excessive bending of the pipeline, and in turn to actuate main butterfly valve means disposed to interrupt the flow of water introduced to the pipeline. This in turn shuts down the entire sprinkling apparatus. The invention contemplates the introduction of pressure or a drop in pressure, to effect the closure of the main butterfly valve means.

BRIEF DESCRIPTION OF THE DRAWINGS

FIG. 1 is a plan showing portions of a support tower, and a section of the pipeline, including pertinent parts of the conventional automatic control mechanism in combination with the invention mayday system.

FIGS. 2 and 3 are a plan and an elevation, respectively, showing further details of the invention mayday system.

FIG. 4 is an elevation depicting the operation of the invention in the situations where the tower fails to start or to stop.

FIG. 5 is a simplified schematic diagram showing a modified hydraulic system providing a "fail-safe" feature in accordance with the invention system.

DESCRIPTION OF THE PREFERRED EMBODIMENTS regarding FIG. 1 there are shown portions of a support tower 10, such as described in greater detail in the copending applications mentioned above. A pipe 12 is supported by a cross-member 14 on the tower 10. A hose 16 connects an outlet 18 in the pipe 12 with a tower control valve 20 which, in turn, controls the flow of pressurized water via another hose 17 to a water-motor (not shown) which powers the tower.

Extending between the pipe 12 on opposite sides of the tower are a pair of rods 22, 24, the confronting ends of which are secured to a bar 26. The opposite ends of the bars 22, 24 are secured to the pipe 12 on opposite sides of the tower 10. The bar 26 is disposed transversely of the cross-member 14 and is translatably guided via a guide roller 28 disposed in guide tracks 30 at the end of the cross-member 14, for reciprocating movement to and away from the pipe 12. Thus, bending of the pipe 12 causes the bar 26 to move toward or away from the pipe depending upon the directon in which it is bent.

For example, when the pipe 12 bends forwardly (i.e., an end moves towards the top of the FIG. 1), as upon forward movement of the tractor (not shown) or adjacent towers (now shown), the bar 26 moves outwardly from the pipe. A link 32 adjustably coupled between the bar 26 and a pivotable lever 34, moves therewith and pivots the lever 34 about its pivot 36. A collapsible psuh rod assembly 38 is adjustably coupled between the opposite end of the lever 34 and a plunger 40 of the valve 20, the latter being a known plunger actuated, tower control valve.

Pivoting of lever 34 (when the pipe bends forwardly) causes the collapsible push rod assembly 38 to push against the plunger 40 of the (normally-closed) valve 20, opening the latter and providing a controlled flow of water under pressure to the water-motor (not shown) via the hoses 16 and 17. The tower 10 starts forwardly, bending the pipe 12 between it and the next tower (not shown) which causes movement of the latter. The action continues on down the line of towers. Conversely as the tower travels forwardly, the bend in the adjacent portions of pipe 12 gradually decreases, thus causing bar 26 to move rearwardly in guide tracks 30, whereby lever 34 is reversed about pivot 36 and the push rod assembly 38 is relieved from plunger 40, thus stopping water flow to the water motor.

When the line is operated in the opposite direction (i.e., towards the bottom of the FIG. 1), the valve 20 opens upon bending of the pipe in the opposite direction, accomplished by substituting a link 32a for the link 32 and coupling to the opposite end of the lever 34. Proper adjustment of the valve 20 opening is provided via a threaded assembly 42, 42a on each link 32, 32a.

In accordance with the 1nvention, a "mayday" safety shutoff system is indicated at 44 and generally includes the collapsible push rod assembly 38, a mayday safety shutoff valve, mechanism integral with the collapsible push rod 38, and associated pressure lines.

More particularly, referring to FIGS. 2 and 3, there is shown the collapsible push rod assembly 38 coupled to the pivotable lever 34 by bolt 48 and also to the tower control valve 20. A push rod bracket 50 provides support for a translatable push rod 52 disposed therein. A valve support bracket 54 secured to the valve 20 supports the push rod 52 of the assembly 38 in alignment with the plunger 40 of the valve 20. A spring 56 is disposed about the push rod 52, and is confined by a retainer plate 58 secured to the push rod bracket 50, and a pin 60 through the rod at the other end of the spring 56. An aperture in the retainer plate 58 allows axial translation therethrough of the push rod 52.

A mayday safety shutoff valve 62, of the plunger actuated type, is secured to the valve support bracket 54, with a plunger 64 thereof slidably bearing against a slide cam member 66 of a cam means 68. A circular member 70 is preferably rotatably supported by the valve support bracket 54 and together with the slide cam member 66 comprises the cam means 68. The slide cam member 66 is adjustably coupled to the push rod bracket 50 via a threaded cam rod 72 and a mounting tab 74.

One side of the (normally-closed mayday valve 62 is tapped to the pipe 12 via a pressure line 76, to provide water pressure thereto. The other side of the valve 62 is coupled to a safety hydraulic line 78 which extends between, and is coupled to, successive mayday safety control valves 62 of each tower 10, the full length of the pipeline.

In operation, initial bending of the pipe 12 causes the collapsible push rod assembly 38 to operate as a solid unit. Thus, an allowable minor amount of translation of the push rod bracket 50 and the spring-loaded push rod 52 (as well as cam rod 72 and slide cam member 66), causes depression of the plunger 40 of the control valve 20, to open same and provide flow of pressurized water to the water-motor (not shown) via the hoses 16, 17. Note that spring 56 is sufficiently stiff to overcome the force required to depress the plunger 40, and that a cutaway portion 80 of the slide cam member 66 is long enough to allow sufficient translation of the cam rod 72 and member 66 (and thus plunger 40) without engaging the member 70 with either of the raised portions, i.e., cam shoulders 82a, 82b of the member 66. Thus as long as the pipeline bends within a given amount, the collapsible push rod assembly 38 operates as a solid unit to control the tower control valve 20 and thus movement of the tower. However, as seen in FIG. 4, in the event an individual tower fails to start, falls behind, or stops entirely, excessive bending of the pipe 22 occurs. At this time the push rod 52 has fully depressed the plunger 40, and bears against the yielding valve body. Further bending of the pipe causes additional force on the push rod bracket 50. Since push rod 52 cannot move further the force is exerted against the spring 56 by the retainer plate 58, compressing spring 56 and thereby allowing further translation of the push rod bracket 50. The further translation is imparted to the cam rod 72 and thus to the slide cam member 66.

Accordingly, the cam shoulder 82a is forced between circular member 70 and the plunger 64 of the safety shutoff valve 62, thereby depressing plunger 64 and opening the valve. This in turn introduces a flow of pressurized water from the pressure line 76 to the safety line 78, which is full of water not under pressure, whereby safety line 78 experiences a rise in pressure.

Note that safety line 78 is pressurized by the introduction of pressurized water from any of the mayday safety shutoff valves 62 of any of the individual towers 10. The line 78 is coupled to the main butterfly valve (numeral 90, FIG. 5) located on the winch tractor (not shown) at the input to the line of pipe. Pressure actuated means coupled to the safety line 78 and thence to the main butterfly valve, closes the latter in response to the pressure introduced from the former. Further details of the main butterfly valve and means for actuating it, are variously disclosed in the above mentioned copending applications and are not further described here.

In the situation where a tower 10 fails to stop as when directed by the conventional control mechanism, it progresses excessively ahead of the rest of the towers thus causing excessive bending in a sweptback configuration (i.e., an end lags excessively). In this event, the bar 26 moves excessively towards the pipe 12, and the push rod bracket 50 translates excessively away from the pipe. The excessive translation of bracket 50 causes excessive movement of the cam rod 72, whereby the cam shoulder 82b is pulled between circular member 70 and the plunger 64 of valve 62. Thus mayday valve 62 Is opened, introducing water pressure to the line 78 and causing shut down of the entire sprinkling apparatus, in accordance with the invention.

FIG. 5 is a simplified schematic diagram illustrating a modified hydraulic mechanism of the "mayday" safety shutoff system which provides shutdown of the entire sprinkling apparatus when there is a drop in pressure in the safety line 78, rather than an increase in pressure, as previously described in FIGS. 2–4. The principal advantage of such a "fail-safe" mayday safety shutoff system 84, is that a break in the long hydraulic line (i.e., line 78 etc., of FIGS. 1–4) will result in automatic shut down of the sprinkling apparatus. The pressurized mayday system of FIGS. 2–4 will not provide shut down of the entire sprinkling apparatus in the unlikely, but possible, event there is a break in the safety line 78.

Accordingly, a hydraulic cylinder 86 has a piston and rod 88, the latter being operably coupled to a main butterfly valve, as indicated pictorially at 90. A water filter assembly 92 is coupled to the input water e.g., to a riser 94 on the winch tractor (not shown). The filter assembly 92 is coupled at its output to a volume 97 of cylinder 86 via a line 95, and to a volume 96 of cylinder 86 via a line 98 and a parallel arrangement of a restrictor valve orifice 100, and a (normally closed) bypass valve 102. Volume 96 is also coupled directly to a connector 104. A pressurized, safety line 106 (similar to line 78 of FIGS. 1–4) extends the entire length of the sprinklng apparatus pipeline, and is coupled to each of the normally-closed, two-way safety shutoff valves 62 affixed to each of the individual towers. The shutoff valves 62 each have an inlet connected to line 106 and an outlet vented to the atmosphere. The valves are opened in exactly the same manner as previously described with respect to the unpressurized system. Connectors 108, which couple with the connector 104, are disposed at either end of the line 106 whereby either end of the line may be coupled to the mayday mechanism located on the tractor. The opposite, free end of the line 106 is plugged.

In any event, water is filtered in assembly 92 and is introduced to volumes 97 and 96 of the cylinder 86. The inherent pressure differential across the piston (between volumes 97, 96) causes the rod 88 to extend from the cylinder as shown, holding the main butterfly valve 90 open. Pressurized water is fed to volume 96, as well as to the entire safety line 106 during operation of the apparatus, via orifice 100.

In the situations described above in FIG. 4, if any tower becomes excessively out of line, its respective mayday valve 62 will open as previously described relative to FIG. 4, rapidly dumping water from the pressurized safety line 106 into the atmosphere. Since water cannot be provided to volume 96 with such rapidity due to the restriction of the orifice 100, the pressure in volume 96 will be lowered via the dumping action of the safety line 106. The pressure in the volume 97 however remains high, causing the piston and rod 88 of the cylinder 86 to move towards the safety line end of the cylinder. This closes the main butterfly valve 90, shutting down the entire sprinkling apparatus. The apparatus remains at rest until the errant tower is straightened and the system is re-set.

Note that if a break occurs in the safety line 106 side of the mayday safety shutoff system 84, the apparatus is shut down in the same manner as if one of the towers had malfunctioned and resulted in the opening of its respective mayday safety shutoff valve 62. Thus possible damage to the sprinkling apparatus due to a break in the safety line of the mayday safety shutoff system rendering such system inoperative, is prevented in the "fail-safe" configuration of FIG. 5.

What is claimed is:

1. An all water responsive mechanical safety shutoff system for automatic irrigation apparatus, which apparatus includes a long line of pipe supported and conveyed by a plurality of self-propelled towers in a substantially straight line relationship, said llne of pipe having an input pipe for introduction of a source and flow of water thereto, tower control means, and a motor adapted to propel each respective tower in response to such tower's position relative to the other towers, the safety system comprising:

mechanical means associated with each tower for sensing a selected excessive deviation of a tower and its associated line of pipe from the substantially straight line relationship and actuating a valve means communicating with the pressure in said line of pipe in response thereto, and a water filled non-pressurized means communicating with said source of water for terminating the flow of water to said line of pipe upon an increase in pressure and being pressurized by the introduction of water therein from said valve means and said line of pipe upon actuation of said valve means by respective mechanical sensing means associated with each tower.

2. The safety shutoff system of claim 1 wherein mechanical means and valve means are supported by each tower and are mechanically coupled to said line of pipe to sense an excessive amount of bending thereof and wherein said water filled non-pressurized means comprises a safety water line means coupled to said valve means to selectively actuate the means responsive to the sensing means to terminate the movement of the line of pipe.

3. An all hydraulic-mechanical safety shutoff system for automatic irrigation apparatus, which apparatus includes a long line of pipe supported and conveyed by a plurality of self-propelled towers in a substantially straight line relationship, said line of pipe having an input pipe for introduction of a flow of water thereto, control tower means, and a motor adapted to propel each respective tower in response to such tower's position relative to the other towers, the safety system comprising:

mechanical means for sensing a selected excessive deviation of a tower and its associated line of pipe from the substantially straight line relationship, said means including a collapsible push rod assembly supported on said tower and responsive to the bending of the line of pipe; and safety shutoff valve means supported by said tower, said safety shutoff valve means being responsive to the collapsible push rod assembly when the line of pipe experiences said excessive amount of bending; and safety water line means coupled to said valve means to selectively actuate the means responsive to the sensing means to terminate the movement of the line of pipe.

4. The safety shutoff system of claim 3 wherein the collapsible push rod assembly further comprises;
   push rod means for selectively actuating the tower control valve means in response to initial bending of the line of pipe;
   safety valve actuating mean collapsibly associated with said push rod means and said safety shutoff valve means for selectively actuating the latter in response to the excessive bending of the line of pipe; and
   main valve means disposed in the input pipe and adapted to terminate the flow of water to the line in response to the selective actuation of the safety shutoff valve means.

5. The safety shutoff system of claim 4, wherein the safety valve actuating means further includes; a push rod bracket for translatably supporting the push rod means, a spring disposed within the bracket and adapted to urge the push rod means against the tower control valve means in response to said initial bending and to compress in response to said excessive bending, cam means coupled to the push rod bracket and adapted to actuate the safety shutoff valve means in response to the excessive bending of the pipe.

6. An all hydraulic-mechanical safety shutoff system for automatic irrigation apparatus, which apparatus includes a long line of pipe supported and conveyed by a plurality of self-propelled towers in a substantially straight line relationship, said line of pipe having an input pipe for introduction of a flow of water thereto, tower control means, and a motor adapted to propel each respective tower in response to such tower's position relative to the other towers, the safety system comprising:
   mechanical means for sensing a selected excessive deviation of a tower and its associated line of pipe from the substantially straight line relationship; and
   water pressure means responsive to the mechanical sensing means and actuated thereby to selectively terminate the movement of and flow of water to the line of pipe; and
   safety shutoff valve means supported by each said tower and mechanically coupled to said line of pipe to sense an excessive amount of bending thereof; and
   safety water line means hydraulically coupled to said line of pipe for introducing water under pressure from said line of pipe to each safety shutoff valve means on the respective towers.

7. The safety shutoff system of claim 6 wherein said sensing means includes a collapsible push rod assembly carried on each tower, means coupled to said push rod assembly to actuate same upon bending of the line of pipe adjacent each said tower, said push rod assembly adapted to operate the tower control means and associated motor, and further adapted to operate safety shutoff means also associated with each said tower.

8. The safety shutoff system of claim 6 wherein said responsive means includes hydraulic motor means operatively coupled to the main water supply valve means, and to the safety water line means and the safety shutoff valve means, said water motor means responsive to a drop in pressure in the safety water line means to operate the main water supply valve and to terminate movement of the irrigation apparatus.

9. The safety shutoff system of claim 8 wherein the responsive means includes;
   hydraulic cylinder means having a piston which defines therein first and second volumes, means for introducing pressurized water to the volumes, restrictor valve means disposed in the path of water flow to the second volume, hydraulic fluid line means coupled from the second volume to the plurality of safety shutoff valve means and thence to the atmosphere, said safety shutoff valve means being responsive to excessive bending of the pipe to cause venting of the hydraulic fluid line means to the atmosphere and a consequent drop in pressure in said line means and in said second volume to actuate the main water supply valve to terminate the flow of water to the line of pipe and to terminate movement of the apparatus, and to a break in said hydraulic fluid line means similarly reducing pressure in said second volume to actuate the main water supply valve to terminate the flow of water to said line of pipe, and to terminate movement of the apparatus.

10. The safety shutoff system of claim 8 further including main water supply valve actuating means coupled to said water pressure means and to a main water supply valve, said valve actuating means responsive to an increase in pressure in said water pressure means to actuate the main water supply valve to a closed position and to terminate movement of said apparatus.

11. Safety shutoff system of claim 8 wherein said hydraulic motor means has two ends thereof connected to the source of water for the apparatus and wherein a restrictor valve is placed between one end of said hydraulic motor means and the water source.

12. An all water responsive mechanical safety shutoff system for automatic irrigation apparatus, which apparatus includes a long line of pipe supported and conveyed by a plurality of self-propelled towers in a substantially straight line relationship, said line of pipe having an input pipe for introduction of a source and flow of water thereto, tower control means, and a motor adapted to propel each respective tower in response to such tower's position relative to the other towers, the safety system comprising:
   mechanical means associated with each tower for sensing a selected excessive deviation of a tower and its associated line of pipe from the substantialy straight-line relationship,
   a dump valve means retained on each said tower and actuated by said mechanical means,
   a pressurized water-filled means communicating with said source of water and each said valve means for terminating the flow of water to said line of pipe upon a decrease in pressure in said means upon actuation of said valve means to dump water from said pressurized means.

13. The safety shutoff system of claim 12 wherein a main valve is positioned between said source of water and said line of pipe,
   said pressurized water-filled means comprises a safety water line coupled to each said dump valve, to said source of water upstream from said main valve, and to hydraulic means for actuating the opening and closing of said main valve, and means associated with said safety water line for restricting the flow of water thereinto from said source of water.

13. The safety shutoff system of claim 12 wherein a main vale is positioned between said source of wate rand said line of pipe, said pressurized water-filledmeans comprises a safety water line coupled to each said dump valve, to said source of water upstram from said main valve, and to hydraulic means for actuting the opening and closing of said main valve, and means associated with said safety water line for restricting theflow of water thereint from said source of w ater.

* * * * *

FO-1050
(5/69)

UNITED STATES PATENT OFFICE
CERTIFICATE OF CORRECTION

Patent No. 3750696          Dated August 7, 1973

Inventor(s) Gail Cornelius

It is certified that error appears in the above-identified patent and that said Letters Patent are hereby corrected as shown below:

IN THE SPECIFICATION

Column 1, line 40 "pipellne" should be --pipeline--.

line 47 "stoppIng" should be --stopping--.

Column 2, line 16 "AccordIngly" should be --Accordingly--.

line 59 "regarding" should be --Regarding--.

Column 3, line 9 "directon" should be --direction--.

Column 3, line 18 "psuh" should be --push--.

Column 3, line 45 "lnvention" should be --invention--.

Column 4, line 6 "(normally-closed" should be -(normally-closed)

Column 4, line 35 "yielding" should be --unyielding--.

Column 5, line 7 "1s" should be --is--.

Column 5, line 35 "sprinklng" should be --sprinkling--.

IN THE CLAIMS:

Please note that Claim 13 was printed twice.

Signed and sealed this 17th day of September 1974.

(SEAL)
Attest:

McCOY M. GIBSON JR.
Attesting Officer

C. MARSHALL DANN
Commissioner of Patents